US011726531B2

(12) United States Patent
Tsai et al.

(10) Patent No.: US 11,726,531 B2
(45) Date of Patent: Aug. 15, 2023

(54) HINGE AND ELECTRONIC DEVICE USING THE SAME

(71) Applicant: SHIN ZU SHING CO., LTD., New Taipei (TW)

(72) Inventors: Tsung-Yang Tsai, New Taipei (TW); Ming-Chin Lin, New Taipei (TW)

(73) Assignee: SHIN ZU SHING CO., LTD., New Taipei (TW)

(*) Notice: Subject to any disclaimer, the term of this patent is extended or adjusted under 35 U.S.C. 154(b) by 0 days.

(21) Appl. No.: 17/368,960

(22) Filed: Jul. 7, 2021

(65) Prior Publication Data

US 2022/0269315 A1    Aug. 25, 2022

(30) Foreign Application Priority Data

Feb. 20, 2021    (TW) ................................ 110201902

(51) Int. Cl.
*G06F 1/16*    (2006.01)
(52) U.S. Cl.
CPC .......... *G06F 1/1681* (2013.01); *G06F 1/1616* (2013.01)
(58) Field of Classification Search
CPC .............................. G06F 1/1681; G06F 1/1616
See application file for complete search history.

(56) References Cited

U.S. PATENT DOCUMENTS

| | | | | |
|---|---|---|---|---|
| 7,874,044 B1* | 1/2011 | Huang | .................. | G06F 1/1681 16/286 |
| 10,289,176 B1* | 5/2019 | Chen | ...................... | G06F 1/206 |
| 10,416,727 B2* | 9/2019 | Lin | ...................... | G06F 1/1681 |
| 10,520,990 B2* | 12/2019 | Chen | ...................... | G06F 1/1656 |
| 10,642,309 B2* | 5/2020 | Cheng | ..................... | G06F 1/203 |
| 10,788,854 B1* | 9/2020 | Liang | ..................... | G06F 1/1681 |
| 11,016,528 B2* | 5/2021 | Lin | ...................... | G06F 1/1616 |
| 11,054,868 B2* | 7/2021 | Lin | ...................... | G06F 1/1616 |
| 11,079,809 B2* | 8/2021 | Morino | ................. | G06F 1/1681 |
| 11,132,026 B2* | 9/2021 | Yang | ..................... | G06F 1/1647 |
| 11,132,031 B2* | 9/2021 | Lin | ...................... | G06F 1/1616 |
| 11,175,705 B1* | 11/2021 | Hsu | ....................... | G06F 1/1681 |
| 2019/0094918 A1* | 3/2019 | Lin | ........................ | G06F 1/166 |
| 2019/0317552 A1* | 10/2019 | Cheng | ..................... | E05D 11/00 |
| 2019/0369677 A1* | 12/2019 | Chen | ...................... | G06F 1/206 |
| 2020/0183451 A1* | 6/2020 | Lin | ....................... | G06F 1/1666 |

(Continued)

*Primary Examiner* — Anthony M Haughton
*Assistant Examiner* — Theron S Milliser
(74) *Attorney, Agent, or Firm* — Alan D. Kamrath; Karin L. Williams; Mayer & Williams PC

(57) ABSTRACT

A hinge is adapted to an electronic device having two screens. A base body of the hinge is mounted to a host base of the electronic device. The base body includes an operating portion and a linkage portion connected to each other. A first screen of the two screens is connected to the operating portion; a second screen of the two screens is connected to the linkage portion. The first screen rotates according to an operating part of the operating portion, and a driver assembly of the hinge simultaneously drives the operating portion and the linkage portion to rotate, so that the first screen and the second screen rotate simultaneously. By the simple hinge linkage structure design, the two screens rotate in opposite directions when being open, and may provide parallel slopes for viewing when being open to a preset open angle, thereby enhancing the convenience and smoothness of operation.

9 Claims, 16 Drawing Sheets

(56) References Cited

U.S. PATENT DOCUMENTS

| | | | |
|---|---|---|---|
| 2020/0241603 A1* | 7/2020 | Lin ........................ | G06F 1/1662 |
| 2020/0264672 A1* | 8/2020 | Morino .................. | G06F 1/1637 |
| 2020/0285273 A1* | 9/2020 | Liang .................... | G06F 1/1649 |
| 2021/0011525 A1* | 1/2021 | Lin ......................... | G06F 1/165 |
| 2021/0124398 A1* | 4/2021 | Yang ..................... | G06F 1/1616 |

* cited by examiner

HINGE AND ELECTRONIC DEVICE USING THE SAME

TECHNICAL FIELD

The present invention relates to a hinge and an electronic device using the same and, more particularly, to a hinge and an electronic device having two screens using the same.

RELATED ART

A conventional electronic device having two screens includes a hinge, a base, and a cover. The hinge is connected to the base and the cover, so that the cover may be rotated relative to the base to be closed or open. Generally speaking, a main screen is disposed on the cover, and an auxiliary screen is disposed beside a keyboard on the base. The disposition angle of the auxiliary screen is close to the horizontal. When a user views the auxiliary screen, the auxiliary screen easily reflects light coming from above, resulting that it is not easy for the user to view and is easy to cause eye fatigue. In addition, because the viewing angles of the auxiliary screen and the main screen are very different, the user's eyes will become fatigued when switching between the two screens.

SUMMARY

The main purpose of the present invention is to provide a hinge and an electronic device using the same. After the auxiliary screen (hereinafter referred to as "second screen") is raised to a certain angle, the auxiliary screen and the main screen (hereinafter referred to as "first screen") may rotate together to adjust their angles, so that the two screens may provide the visual integrity and continuity when they are at the working angle.

In order to achieve the above purpose, the present invention provides a hinge including a base body, a driver assembly, a driving gear assembly, and a driven gear assembly. The base body includes an operating portion, a linkage portion, and a base portion. The operating portion and the linkage portion are respectively connected to two ends of the base portion. The operating portion has an operating part. The linkage portion has an arc slot. The arc slot is provided with an arc sliding part. The driver assembly includes a driving portion and a driven portion connected to each other. The driving portion is pivotally connected to the operating part of the operating portion. The driven portion is pivotally connected to the arc sliding part of the linkage portion. The driving gear assembly is connected to the operating part of the operating portion. The driving gear assembly is located on an opposite side of the driver assembly. The driven gear assembly is pivotally connected to the driving gear assembly. The driven gear assembly cooperates with the driving gear assembly to rotate accordingly. When the operating part rotates, the driving portion of the driver assembly drives the driven portion to drive the arc sliding part to move along an inner arc trajectory of the arc slot.

In an embodiment of the present invention, the driving gear assembly comprises at least one driving shaft part, a first driving gear, and a second driving gear engaging with each other. Two ends of the driving shaft part are respectively axially connected to the operating part and the first driving gear. The driven gear assembly includes at least one driven shaft part, a first driven gear, and a second driven gear engaging with each other. The driven shaft part is axially connected to the first driven gear and the second driving gear.

In an embodiment of the present invention, the hinge further includes a first movable mounting part and a second movable mounting part. The first movable mounting part is axially connected to the second driven gear. The second movable mounting part is axially connected to the arc sliding part.

In an embodiment of the present invention, the hinge further includes a torque assembly. The driven gear assembly further includes a third driven gear. The torque assembly is connected to one side of the third driven gear. The third driven gear and the second driven gear engage with each other.

In an embodiment of the present invention, the hinge further includes a fixing part located on one side of the second driven gear and the third driven gear.

In an embodiment of the present invention, the hinge further includes a torque assembly and a first movable mounting part. The torque assembly is connected between the first movable mounting part and the second driven gear.

In an embodiment of the present invention, the driver assembly further includes a linkage part. Two ends of the linkage part are respectively pivotally connected to the driving portion and the driven portion. The linkage part has a limit position opening. The base portion is provided with a stop part. The stop part is located in the limit position opening.

In an embodiment of the present invention, a movement margin of the stop part in the limit position opening is equal to a moving range of the arc sliding part in the arc slot and a moving range of the driving portion driving the operating part.

In an embodiment of the present invention, the operating portion further includes two spacers arranged at intervals to define a first accommodating space and a second accommodating space. The driving gear assembly is disposed in the first accommodating space. The driven gear assembly is disposed in the second accommodating space.

The present invention further provides an electronic device including the above-mentioned hinge, a host base, a first screen, and a second screen. The base body of the hinge is mounted to the host base. The first screen is electrically connected to the host base, and the first screen is connected to the operating portion by a first movable mounting part. The second screen is electrically connected to the host base, and the second screen is connected to the linkage portion by a second movable mounting part. The first screen rotates according to the operating part, and the driving portion of the driver assembly drives the driven portion to drive the arc sliding part to move along the inner arc trajectory of the arc slot, thereby simultaneously driving the second screen to rotate.

In summary, according to the embodiments of the present invention, the base body of the hinge is mounted to the host base of the electronic device having the two screens. The base body includes the operating portion and the linkage portion connected to each other. The first screen is connected to the operating portion by the first movable mounting part, and the second screen is connected to the linkage portion by the second movable mounting part. The first screen rotates according to the operating part of the operating portion, and the driver assembly of the hinge simultaneously drives the operating portion and the linkage portion to rotate, so that the first screen and the second screen rotate simultaneously. By the simple hinge linkage structure design, when the two screens are open, the first screen and the second screen rotate in opposite directions; when the two screens are open to a preset open angle, the hinge linkage structure starts to perform a simple harmonic motion, so that the first screen and the second screen are switched to rotate in the same direction to provide parallel slopes for viewing, and may provide the visual integrity and continuity when the two screens are at the working angle, thereby enhancing the convenience and smoothness of operation.

The features of the present invention will no doubt become understandable to those of ordinary skill in the art after reading the following detailed description of the preferred embodiment that is illustrated in the various figures and drawings.

DETAILED DESCRIPTION

Figure 1:
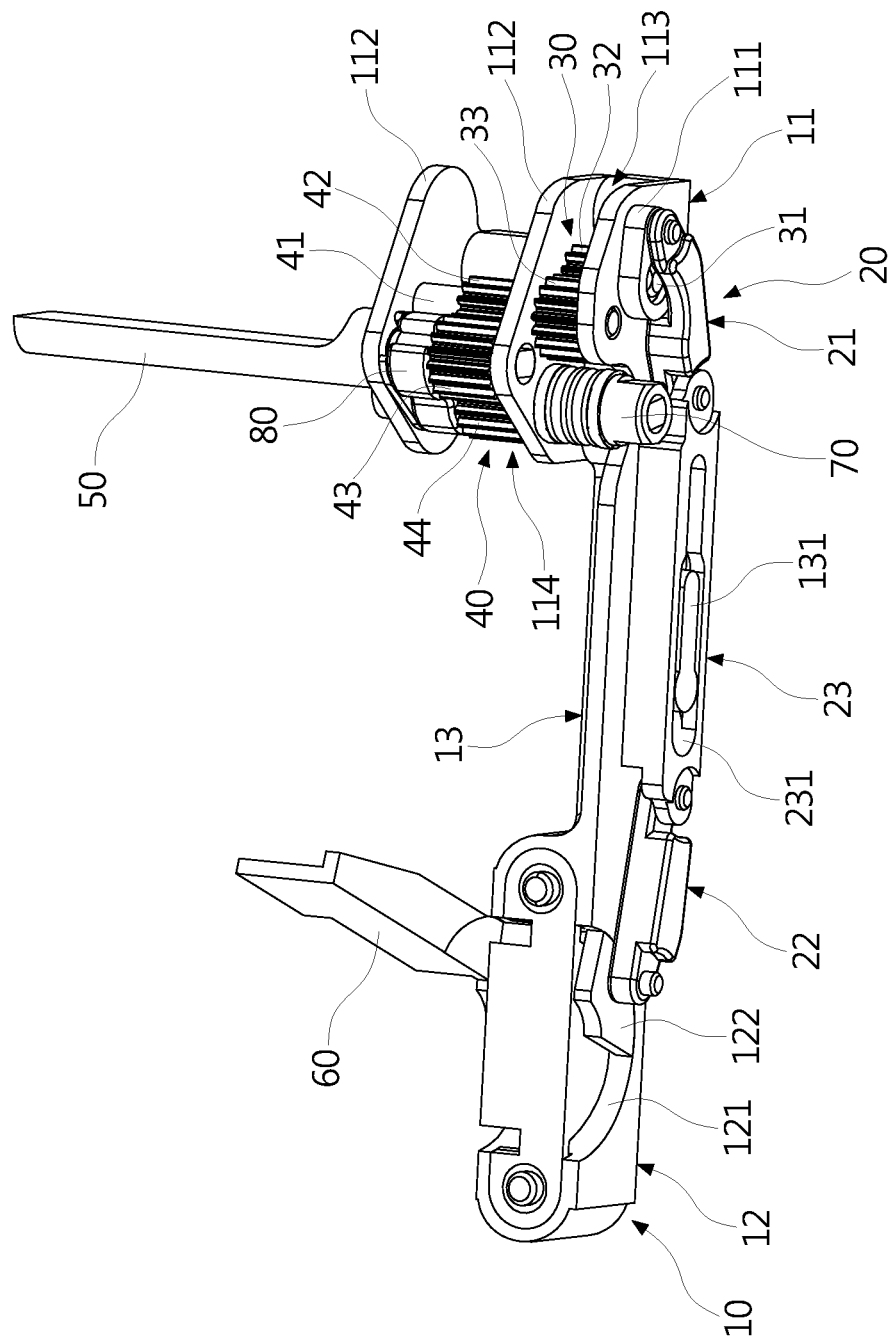
FIG. 1 is a structural perspective view of a hinge according to a first embodiment of the present invention.

In the following embodiments, same or similar reference numerals are used to refer to the same or like components. In addition, directional terms mentioned in the following embodiments, such as up, down, left, right, front, and back may be used with respect to the drawings. The directional terms used herein are for the purpose of describing embodiments only and are not intended to limit the present invention.

Figure 2:
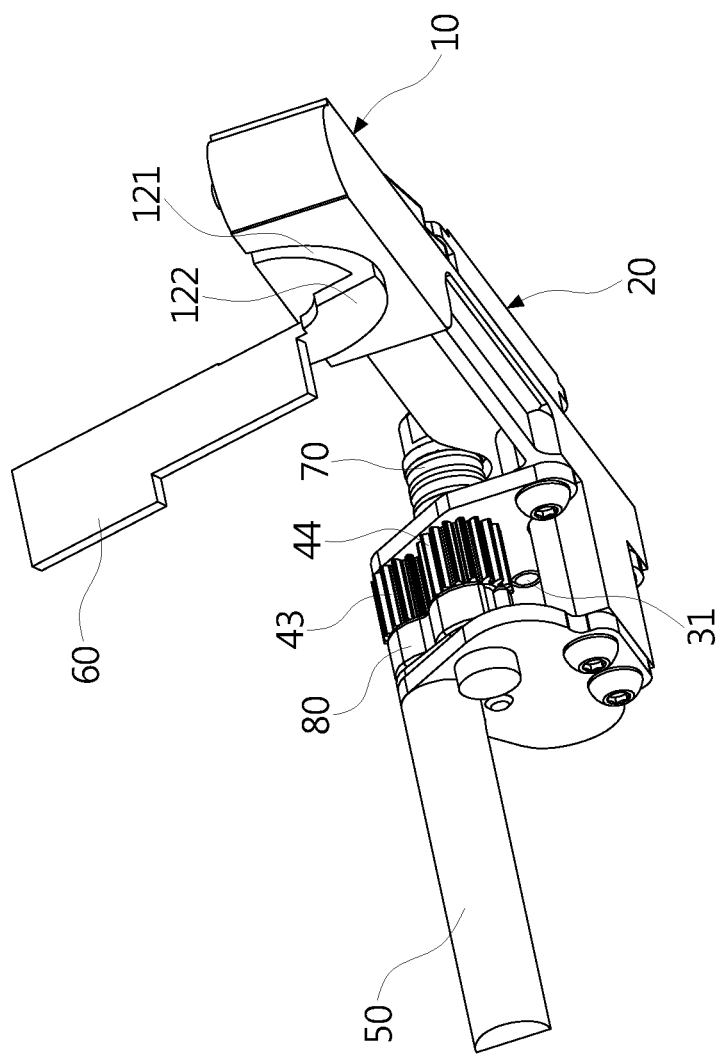
FIG. 2 is a structural perspective view from another angle of view of FIG. 1.
Figure 3:
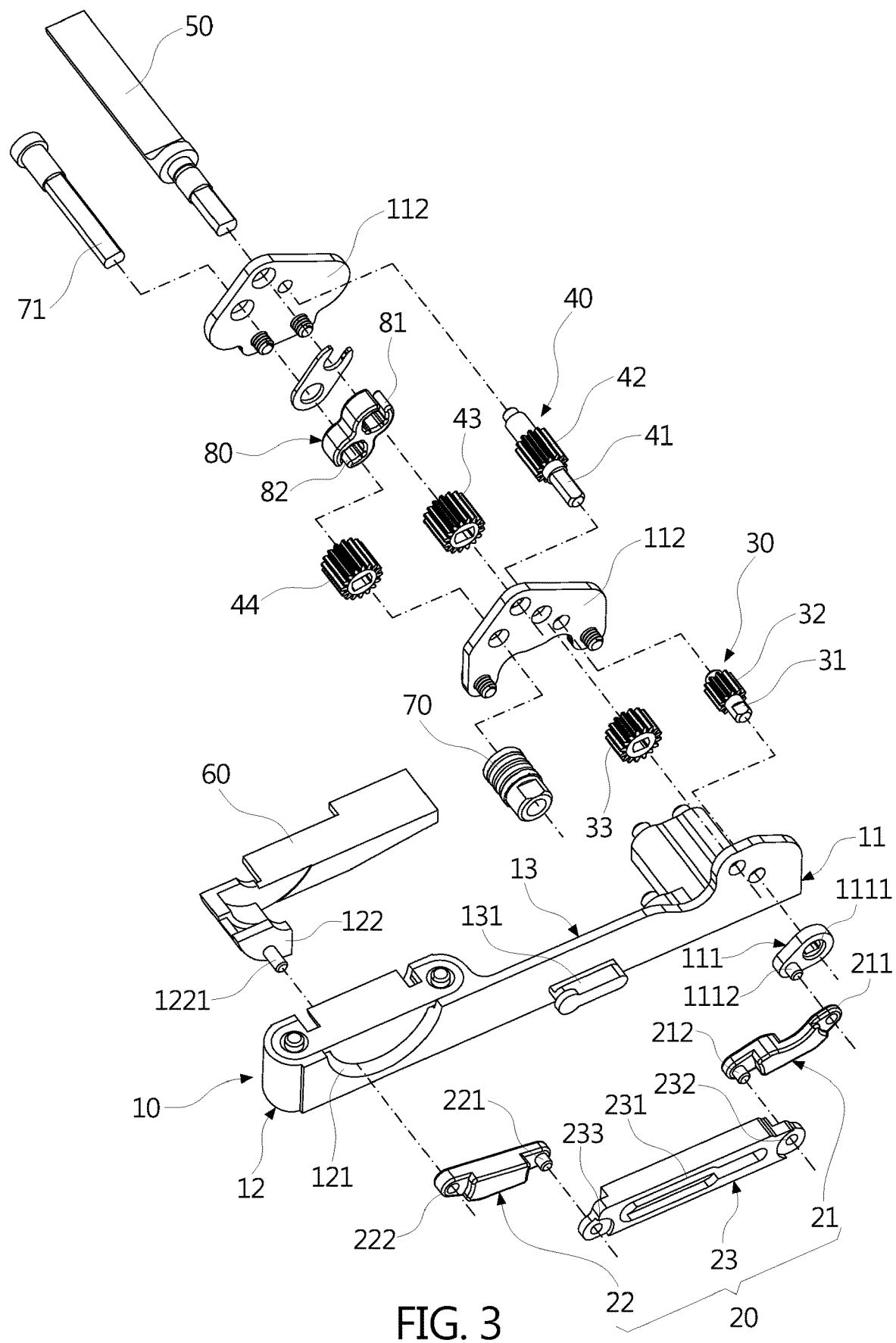
FIG. 3 is a structural exploded view of FIG. 1.

Referring to FIG. 1 to FIG. 3, FIG. 1 is a structural perspective view of a hinge according to a first embodiment of the present invention; FIG. 2 is a structural perspective view from another angle of view of FIG. 1; FIG. 3 is a structural exploded view of FIG. 1. First, components of the overall structure of the hinge of the present invention and an assembling manner thereof are described in detail. The hinge includes a base body 10, a driver assembly 20, a driving gear assembly 30, and a driven gear assembly 40. The base body 10 includes an operating portion 11, a linkage portion 12, and a base portion 13. The operating portion 11 and the linkage portion 12 are respectively connected to two ends of the base portion 13. The operating portion 11 has an operating part 111. The linkage portion 12 has an arc slot 121. The arc slot 121 is provided with an arc sliding part 122. It is noted that the separation distance between the operating portion 11 and the linkage portion 12 must be greater than the length distance of the second screen being closed (it will be described in detail later).

The driver assembly 20 includes a driving portion 21 and a driven portion 22 connected to each other. The driving portion 21 is pivotally connected to the operating part 111 of the operating portion 11. The driving portion 21 and the operating part 111 have connection structures cooperating with each other. Specifically speaking, the operating part 111 is designed as a cam in the embodiment, and includes a first axis connection hole 1111 and a first axis connection part 1112 located on a side of the first axis connection hole 1111. Two ends of the driving portion 21 respectively have a second axis connection hole 211 and a second axis connection part 212. The first axis connection part 1112 is axially connected to the second axis connection hole 211. The driver assembly 20 further includes a linkage part 23. Two ends of the linkage part 23 are respectively pivotally connected to the driving portion 21 and the driven portion 22. The linkage part 23 and the base portion 13 have connection structures cooperating with each other. The base portion 13 is provided with a stop part 131. The linkage part 23 has a limit position opening 231 corresponding to the location of the stop part 131. The stop part 131 is located in the limit position opening 231, and the stop part 131 may linearly move in the limit position opening 231. The two ends of the linkage part 23 respectively have a third axis connection hole 232 and a fourth axis connection hole 233. The second axis connection part 212 is axially connected to the third axis connection hole 232. The driven portion 22 is pivotally connected to the arc sliding part 122 of the linkage portion 12. Specifically speaking, the driven portion 22 and the arc sliding part 122 have connection structures cooperating with each other. Two ends of the driven portion 22 respectively have a third axis connection part 221 and a fifth axis connection hole 222. The third axis connection part 221 is axially connected to the fourth axis connection hole 233. The arc sliding part 122 has a fourth axis connection part 1221. The fourth axis connection part 1221 is axially connected to the fifth axis connection hole 222.

From the above description, the connection manner and linkage relationship between the base body 10 and the driver assembly 20 are clearly understood. The linkage relationship is that the rotation operation manner of the operating part 111 simultaneously drives the driving portion 21, the linkage part 23, and the driven portion 22, and the arc sliding part 122, so that the arc sliding part 122 moves along an inner arc trajectory of the arc slot 121.

Next, the corresponding linkage manner of the driving gear assembly 30 and the driven gear assembly 40, as well as the connection manner and the linkage relationship of the driving gear assembly 30 and the operating part 111 are described. The operating portion 11 further includes two spacers 112 arranged at intervals to define a first accommodating space 113 and a second accommodating space 114. The driving gear assembly 30 is disposed in the first accommodating space 113. The driven gear assembly 40 is disposed in the second accommodating space 114. The driving gear assembly 30 is connected to the operating part 111 of the operating portion 11. The driving gear assembly 30 is located on an opposite side of the driver assembly 20. Specifically speaking, the driving gear assembly 30 includes at least one driving shaft part 31, a first driving gear 32, and a second driving gear 33 engaging with each other. Two ends of the driving shaft part 31 are respectively axially connected to the first axis connection hole 1111 of the operating part 111 and the first driving gear 32. The driven gear assembly 40 includes at least one driven shaft part 41, a first driven gear 42, and a second driven gear 43 engaging with each other. The driven shaft part 41 is axially connected to the first driven gear 42 and the second driving gear 33. By the driven shaft part 41 being axially connected to the second driving gear 33, the driven gear assembly 40 is pivotally connected to the driving gear assembly 30. The driven gear assembly 40 cooperates with the driving gear assembly 30 to rotate accordingly.

The hinge further includes a torque assembly 70, which uses a disc-spring design. The driven gear assembly 40 further includes a third driven gear 44. The torque assembly 70 is connected to one side of the third driven gear 44. The third driven gear 44 and the second driven gear 43 engage with each other. The hinge further includes a fixing part 80 located on one side of the second driven gear 43 and the third driven gear 44. The hinge further includes a first movable mounting part 50 and a shaft 71. The first movable mounting part 50 goes through a first fixing hole 81 of the fixing part 80 and is axially connected to the second driven gear 43. The shaft 71 goes through a second fixing hole 82 of the fixing part 80 and is axially connected to the third driven gear 44. The hinge further includes a second movable mounting part 60. The second movable mounting part 60 is axially connected to the arc sliding part 122, and the second movable mounting part 60 is located on an opposite side of the fourth axis connection part 1221.

The linkage relationship is that the rotation operation manner of the operating part 111 simultaneously drives the driving portion 21, the linkage part 23, the driven portion 22, and the arc sliding part 122, so that the arc sliding part 122 moves along the inner arc trajectory of the arc slot 121. At the same time, the first axis connection hole 1111 of the operating part 111 drives the driving shaft part 31 to rotate, so that the first driving gear 32 and the second driving gear 33 engaging with each other rotate together. The driven shaft part 41 rotates according to the rotation of the second driving gear 33 to drive the first driven gear 42 and the second driven gear 43 engaging with each other to rotate together, and then the second driven gear 43 and the third driven gear 44 engaging with each other rotate together, so that the torque assembly 70 generates torque due to the rotation of the third driven gear 44.

It should be noted that a movement margin of the stop part 131 in the limit position opening 231 is equal to a moving range of the arc sliding part 122 in the arc slot 121 and a moving range of the driving portion 21 driving the operating part 111.

Figure 4:
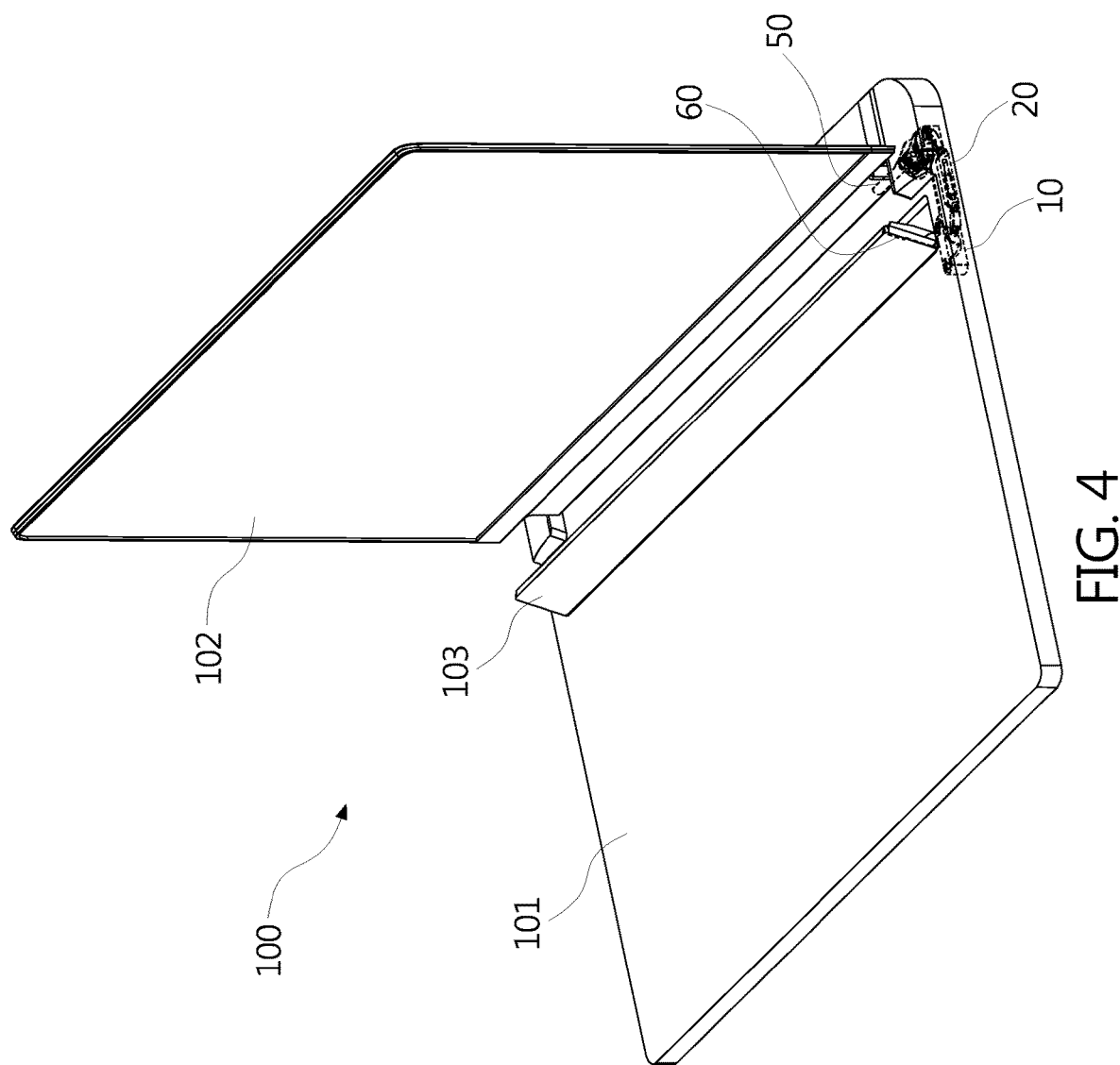
FIG. 4 is a structural perspective view of an electronic device using the hinge according to the first embodiment of the present invention.
Figure 5:
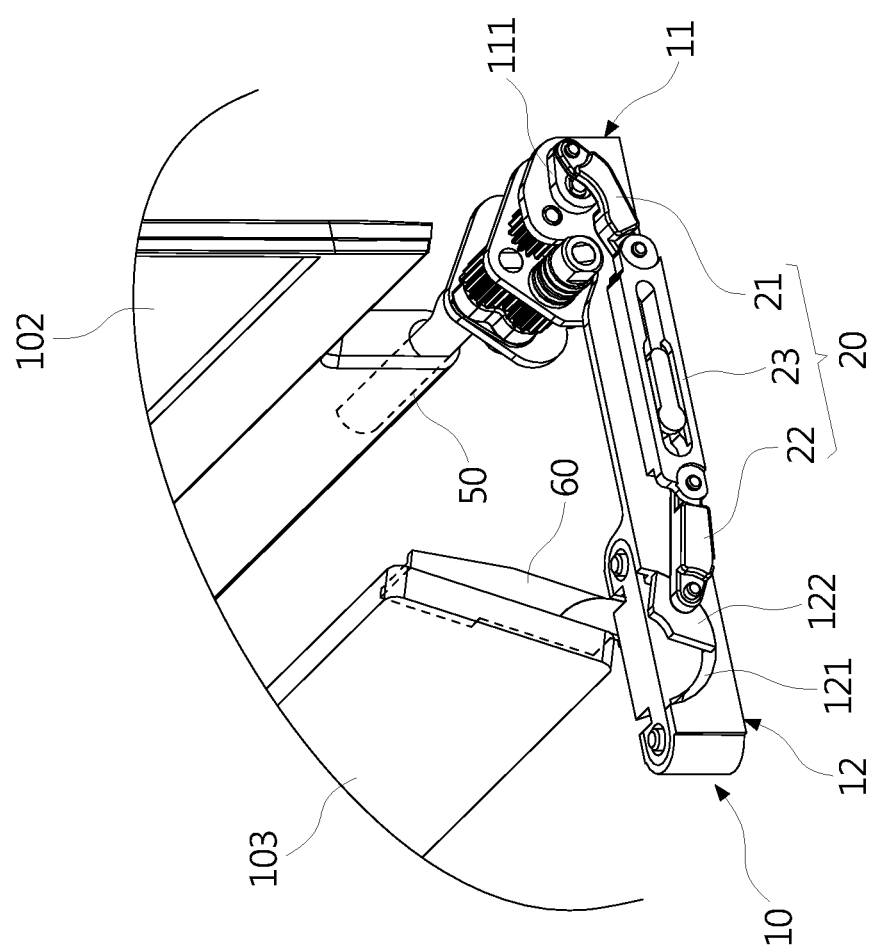
FIG. 5 is a partial enlarged structural perspective view of FIG. 4.

Referring to FIG. 4 and FIG. 5, FIG. 4 is a structural perspective view of an electronic device 100 using the hinge according to the first embodiment of the present invention; FIG. 5 is a partial enlarged structural perspective view of FIG. 4, omitting a host base 101 of FIG. 4. The electronic device 100 includes the hinge as shown in FIG. 1, a host base 101, a first screen 102, and a second screen 103. The base body 10 of the hinge is mounted to the host body 101. The first screen 102 is electrically connected to the host base 101, and the first screen 102 is connected to the operating portion 11 by a first movable mounting part 50. The second screen 103 is electrically connected to the host base 101, and the second screen 103 is connected to the linkage portion 12 by a second movable mounting part 60. The first screen 102 rotates according to the operating part 111, the driving portion 21 of the driver assembly 20 drives the driven portion 22 to drive the arc sliding part 122 to move along the inner arc trajectory of the arc slot 121, thereby simultaneously driving the second screen 103 to rotate. In the embodiment, the electronic device 100 uses two hinges, which are symmetrical and are respectively located on two opposite sides of the host base 101, and only one of two hinges is shown in FIG. 4.

Figure 6:
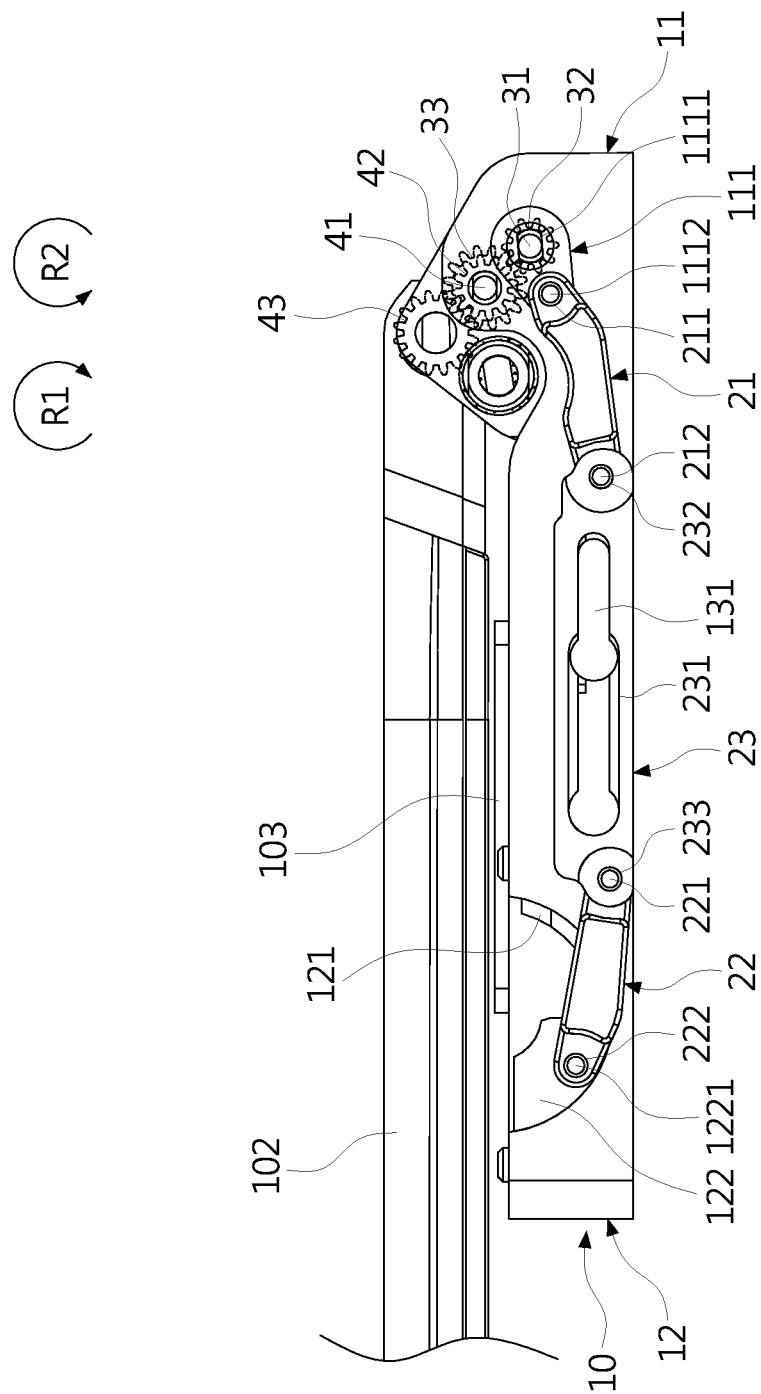
FIG. 6 to FIG. 9 are respectively side views of the electronic device of FIG. 4 at 0, 30, 90, and 140 degrees.
Figure 7:
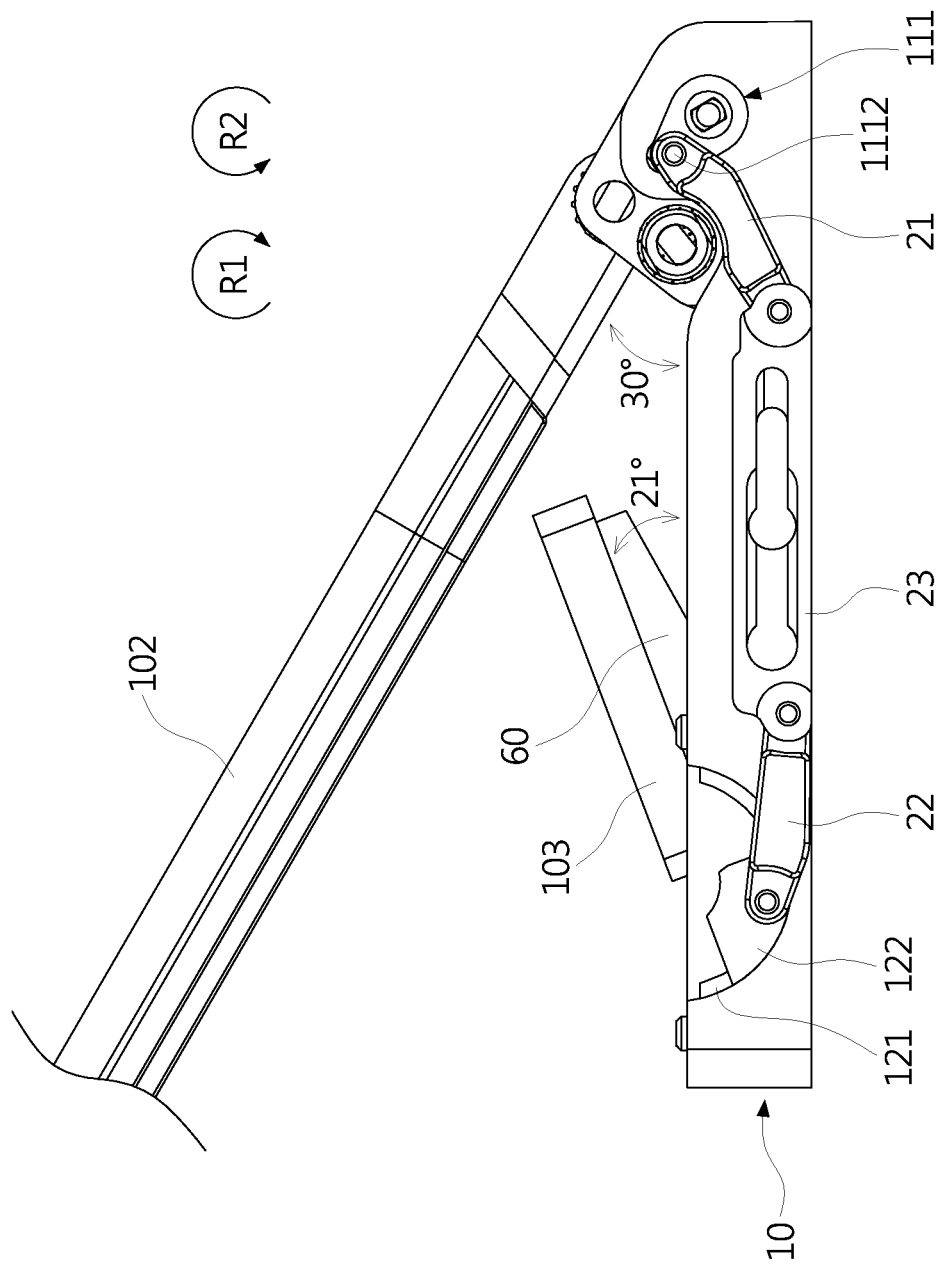

Referring to FIG. 6 to FIG. 9, FIG. 6 to FIG. 9 are respectively side views of the electronic device 100 of FIG. 4 at 0, 30, 90, and 140 degrees. When the first screen 102 of the electronic device 100 rotates relative to the host base 101 to cause the angle between the first screen 102 and the host base 101 is a specific degree, the electronic device 100 is said to be at the specific degree. For example, as shown in FIG. 7, the angle between the first screen 102 and the host base 101 of the electronic device 100 is 30 degrees, the electronic device 100 is said to be at 30 degrees. In order to clearly view the operations of the operating part 111, the driving portion 21, the linkage part 23, the driven portion 22, and the arc sliding part 122, the host base 101 of the electronic device 100 is omitted in the figure. Because the base body 10 of the hinge is mounted to the host base 101 and both of the base body 10 and the host base 101 are horizontally disposed, the angle between the first screen 102 and the base body 10 in the figure may be equivalent to the angle between the first screen 102 and the host base 101.

As shown in FIG. 6, when the electronic device 100 is at 0 degrees, the angle between the first screen 102 and the host base 101 is 0 degrees, and the angle between the second screen 103 and the host base 101 is 0 degrees. At this time, when the first screen 102 is lifted and the first screen 102 rotates in a clockwise direction R1 relative to the host base 101, the first screen 102 drives the first movable mounting part 50 and the second driven gear 43 to rotate in the clockwise direction R1, further drives the driven shaft part 41, the first driven gear 42, and the second driving gear 33 to rotate in a counterclockwise direction R2, and further drives the driving shaft part 31 and the first driving gear 32 to rotate in the clockwise direction R1, so that the operating part 111 rotates in the clockwise direction R1 around the first axis connection hole 1111. When the electronic device 100 is at 0 degrees, the first axis connection part 1112 is approximately located at the leftmost position relative to the first axis connection hole 1111, so the operating part 111 rotates in the clockwise direction R1 around the first axis connection hole 1111 to drive the driving portion 21, the linkage part 23, and the driven portion 22 to move right, and further drives the arc sliding part 122 to move right along the inner arc trajectory of the arc slot 121, so that the arc sliding part 122 and the second screen 103 rotate in the counterclockwise direction R2 relative to the host base 101 until the electronic device 100 becomes to be at 90 degrees. As shown in FIG. 7, when the electronic device 100 becomes to be at 30 degrees, the angle between the first screen 102 and the host base 101 is 30 degrees, and the angle between the second screen 103 and the host base 101 is 21 degrees.

Figure 8:
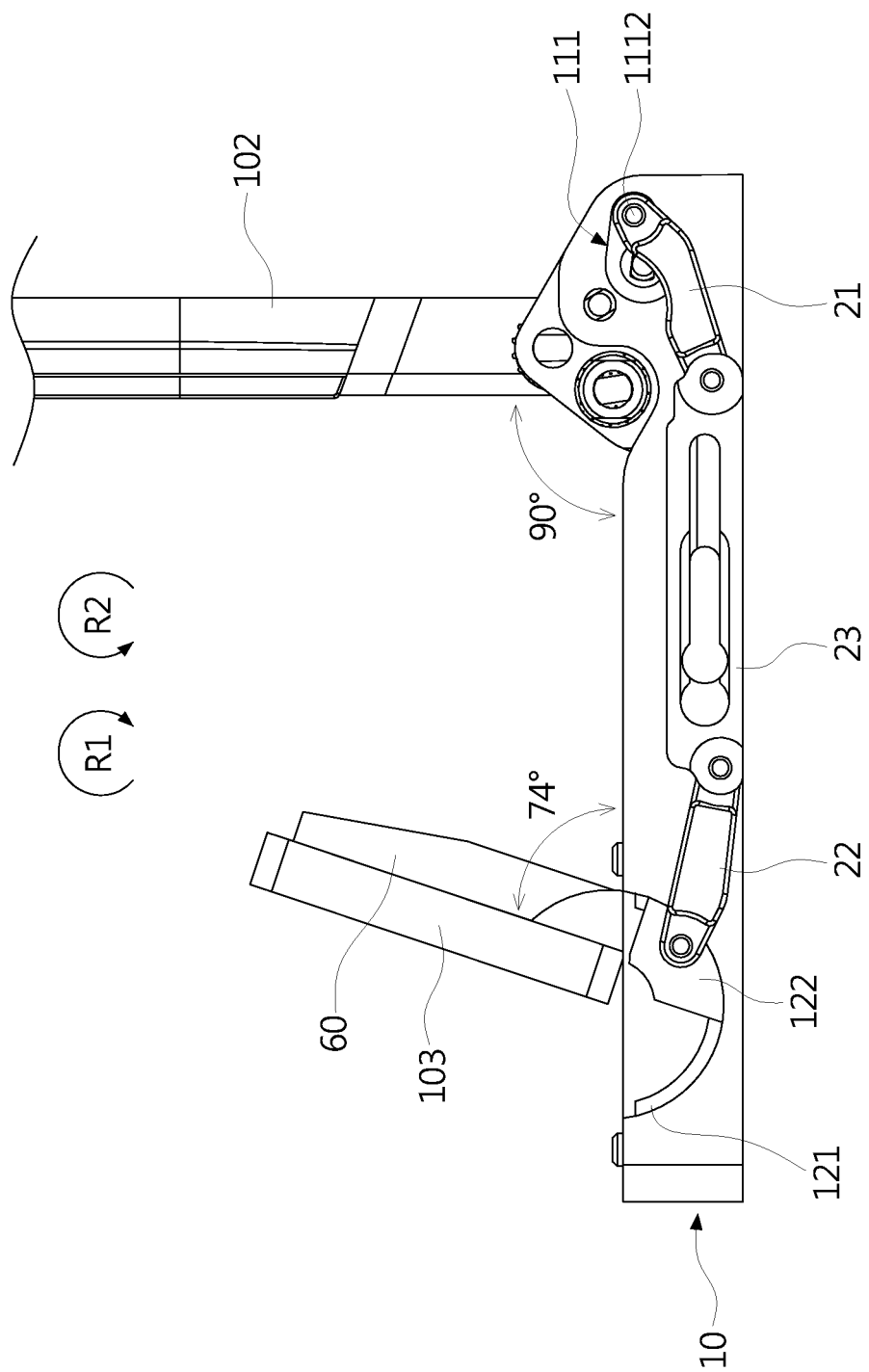
Figure 9:
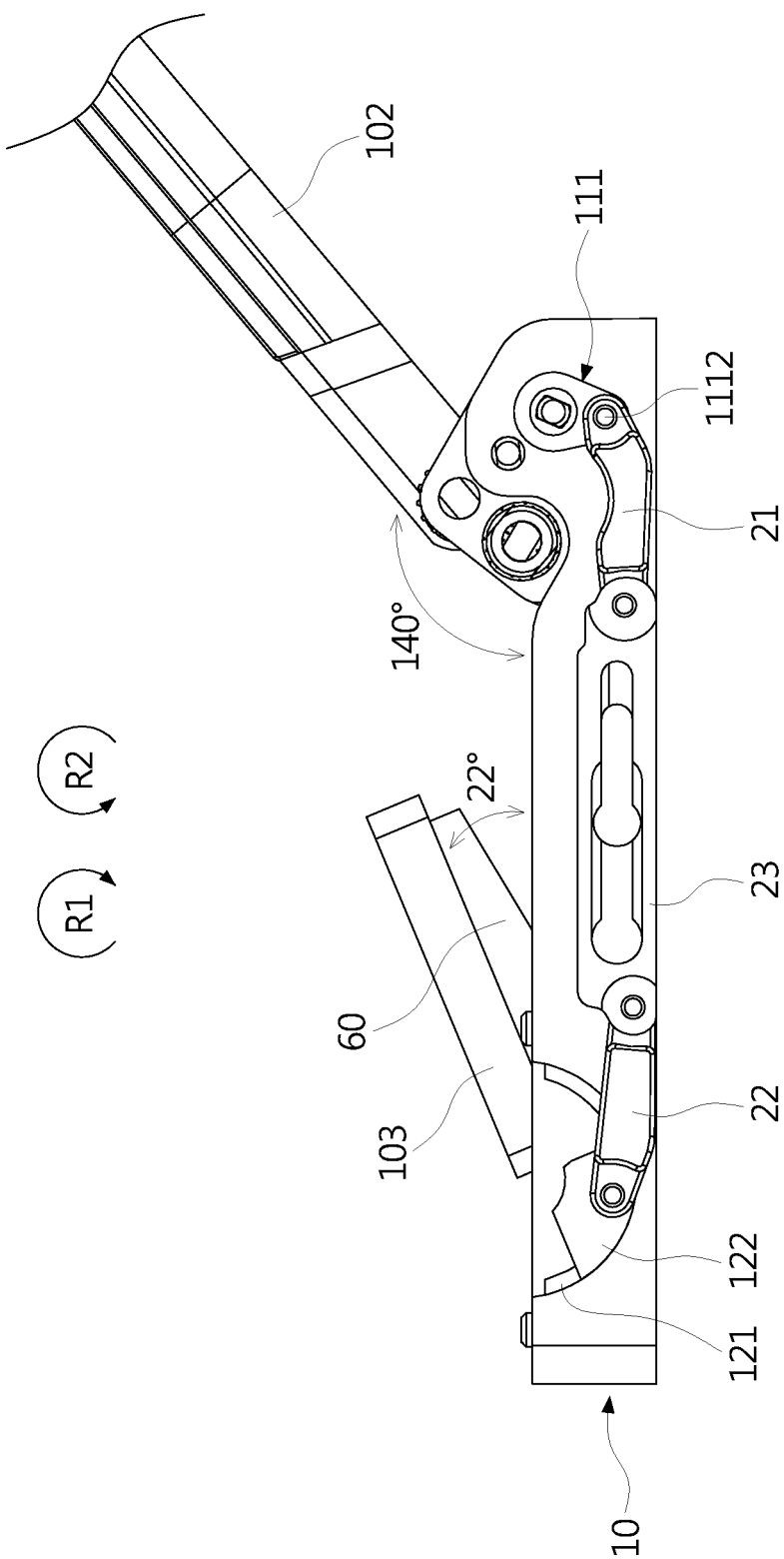

As shown in FIG. 8, when the electronic device 100 becomes to be at 90 degrees, the angle between the first screen 102 and the host base 101 is 90 degrees, and the angle between the second screen 103 and the host base 101 is 74 degrees. At this time, when the first screen 102 continues to rotate in the clockwise direction R1 relative to the host base 101, the first screen 102 continues to drive the first movable mounting part 50 and the second driven gear 43 to rotate in the clockwise direction R1, further drives the driven shaft part 41, the first driven gear 42, and the second driving gear 33 to rotate in the counterclockwise direction R2, and further drives the driving shaft part 31 and the first driving gear 32 to rotate in the clockwise direction R1, so that the operating part 111 rotates in the clockwise direction R1 around the first axis connection hole 1111. When the electronic device 100 is at 90 degrees, the first axis connection part 1112 is approximately located at the rightmost position relative to the first axis connection hole 1111, so the operating part 111 rotates in the clockwise direction R1 around the first axis connection hole 1111 to drive the driving portion 21, the linkage part 23, and the driven portion 22 to become to move left, and further drives the arc sliding part 122 to become to move left along the inner arc trajectory of the arc slot 121, so that the arc sliding part 122 and the second screen 103 will become to rotate in the clockwise direction R1 relative to the host base 101 until the electronic device 100 becomes to be at 140 degrees. As shown in FIG. 9, when the electronic device 100 becomes to be at 140 degrees, the angle between the first screen 102 and the host base 101 is 140 degrees, and the angle between the second screen 103 and the host base 101 is 22 degrees.

It is particularly noted that, by the simple hinge linkage structure design, during the electronic device 100 at 0 to 90 degrees, when the first screen 102 and the second screen 103 are open, the first screen 102 and the second screen 103 rotate in opposite directions. During the electronic device 100 at 90 to 140 degrees, when the first screen 102 and the second screen 103 are open, the hinge linkage structure starts to perform a simple harmonic motion, so that the first screen 102 and the second screen 103 are switched to rotate in the same direction; at this time, the operating part 111 rotates to drive the driving portion 21, the linkage part 23, and the driven portion 22 to move from right to left, and further drives the arc sliding part 122 becomes to move from right to left along the inner arc trajectory of the arc slot 121; at this time, the first screen 102 and the second screen 103 rotate in the same direction to provide parallel slopes for viewing, and may provide the visual integrity and continuity when the two screens are at the working angle, thereby enhancing the convenience and smoothness of operation. In addition, as shown in FIG. 6, the separation distance between the operating portion 11 and the linkage portion 12 of the base body 10 must be greater than the length distance of the second screen 103, so that the first screen 102 and the second screen 103 have no interference problem when they rotate relative to each other.

Figure 10:
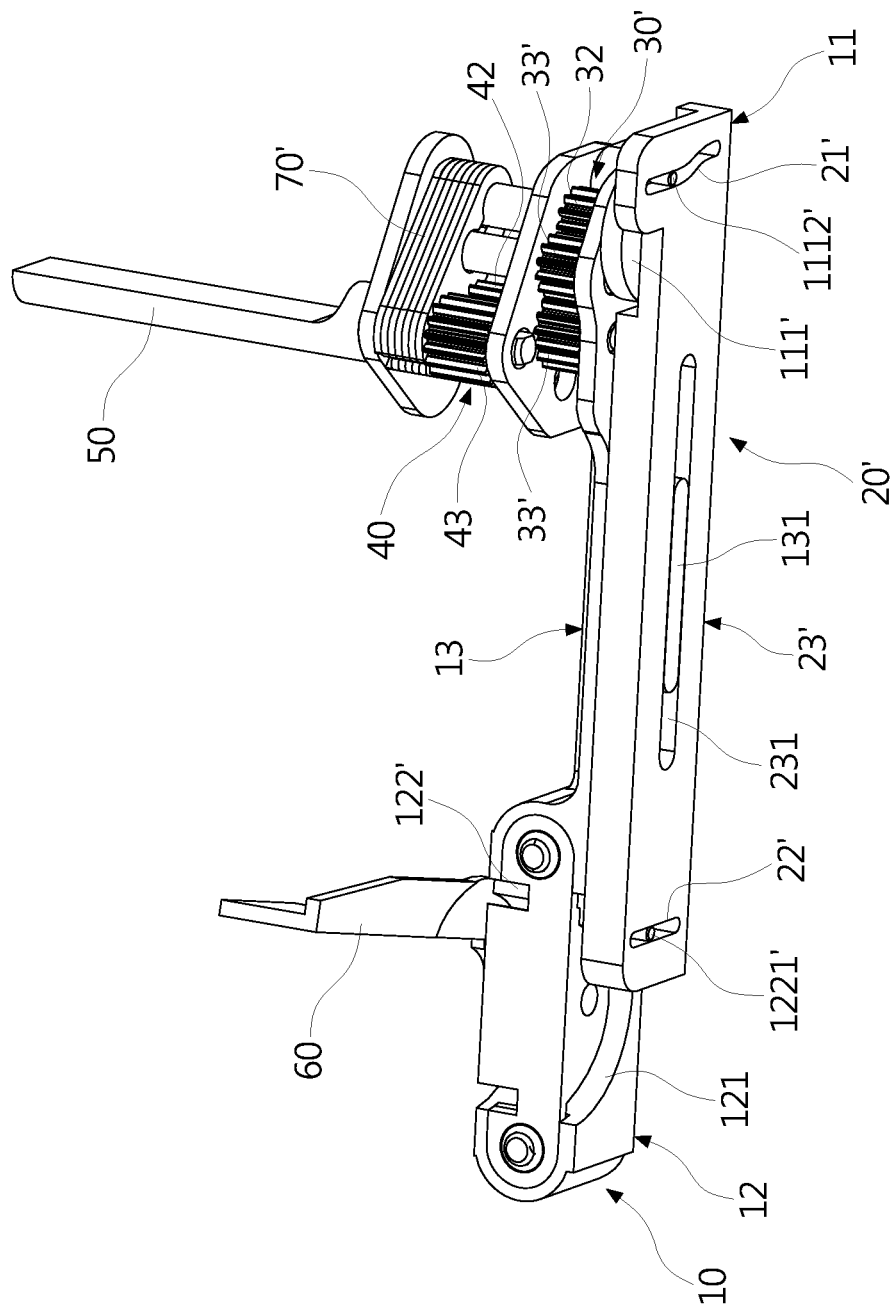
FIG. 10 is a structural perspective view of a hinge according to a second embodiment of the present invention.
Figure 11:
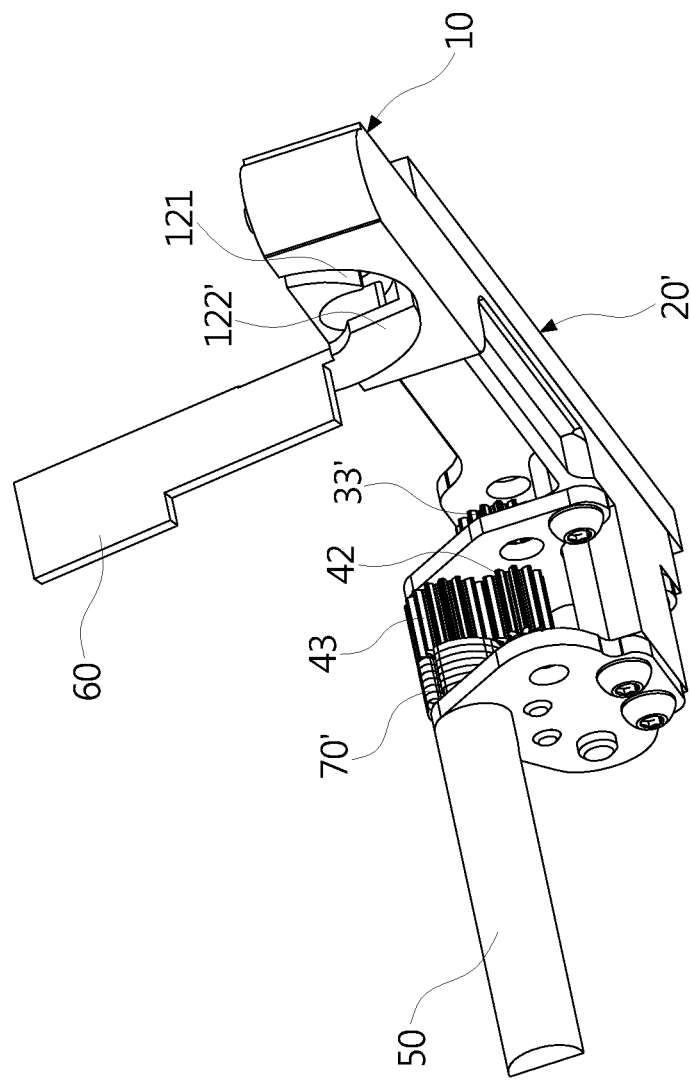
FIG. 11 is a structural perspective view from another angle of view of FIG. 10.
Figure 12:
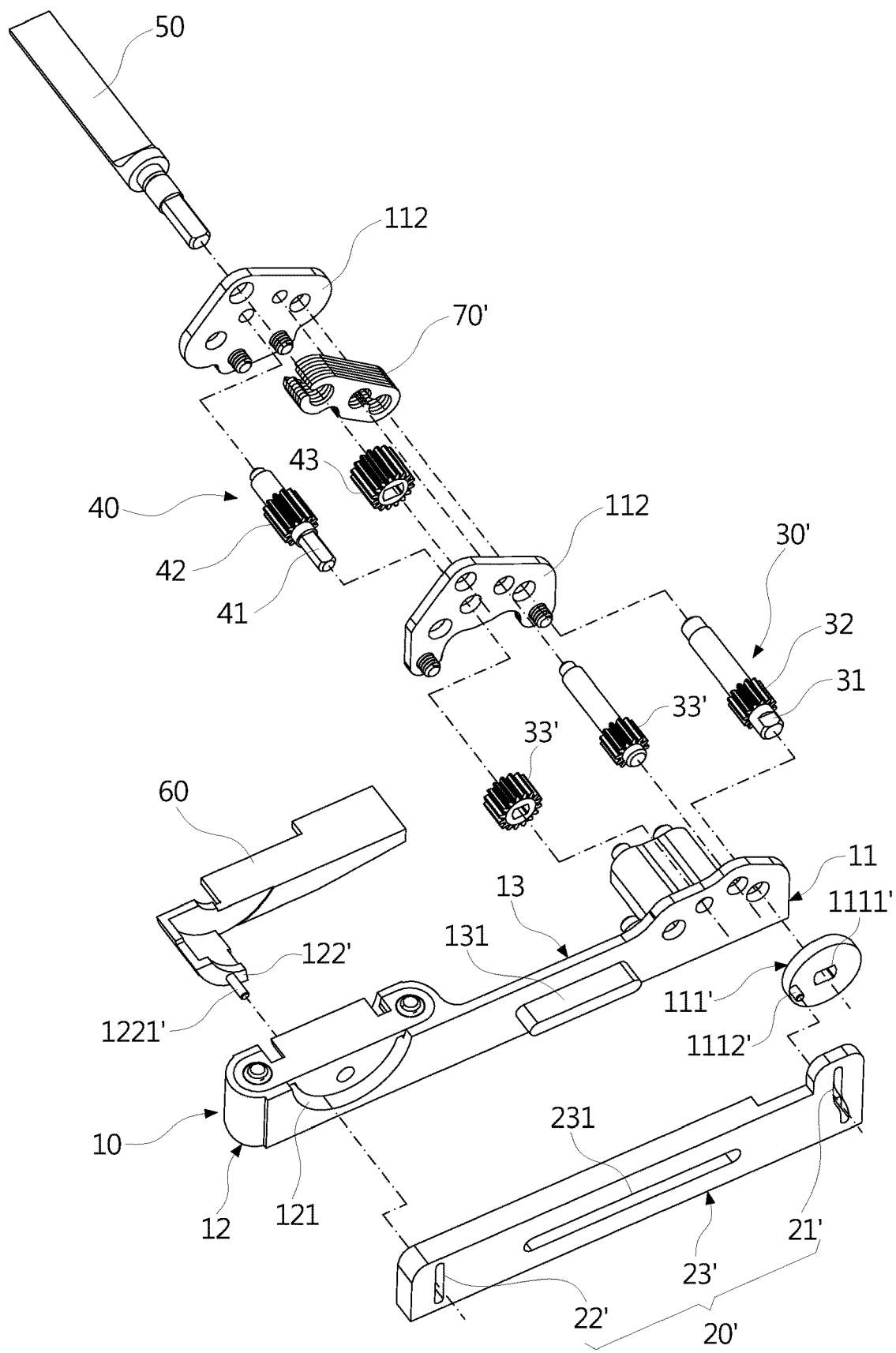
FIG. 12 is a structural exploded view of FIG. 10.

Referring to FIG. 10 to FIG. 12, FIG. 10 is a structural perspective view of a hinge according to a second embodiment of the present invention; FIG. 11 is a structural perspective view from another angle of view of FIG. 10; FIG. 12 is a structural exploded view of FIG. 10. The hinges according to the first embodiment and the second embodiment of the present invention have the same operation concept, so the first embodiment and the second embodiment have the same components and reference numerals, and the same components will not be described while only describing the difference. Compared with the first embodiment, the structural difference of the hinge according to the second embodiment is: the driver assembly 20', the driving gear assembly 30', and the torque assembly 70'. The driving portion 21', the driven portion 22', and the linkage part 23' of the driver assembly 20' are integrally formed. The driving portion 21' and the linkage part 23' are designed as longitudinal slot-shaped holes. The driving gear assembly 30' uses two second driving gear 33' engaging with each other. The torque assembly 70' uses a pipe-spring design, which is connected between the first movable mounting part 50 and the second driven gear 43. In addition, the operating part 111' is designed as a cam in the embodiment, and includes the first axis connection hole 1111' and the first axis connection part 1112' located on a side of the first axis connection hole 1111'. The first axis connection part 1112' is axially connected to the longitudinal slot-shaped hole of the driving portion 21', and the first axis connection part 1112' may move in and along the longitudinal slot-shaped hole. The arc sliding part 122' has the fourth axis connection part 1221'. The fourth axis connection part 1221' is axially connected to the longitudinal slot-shaped hole of the driven portion 22', and the fourth axis connection part 1221' may move in and along the longitudinal slot-shaped hole.

The base body 10 of the hinge according the second embodiment of FIG. 10 is mounted to the host base 101. The first screen 102 is connected to the operating portion 11 by the first movable mounting part 50. The second screen 103 is connected to the linkage portion 12 by the second movable mounting part 60. The first screen 102 rotates according to the operating part 111', the driving portion 21' of the driver assembly 20' drives the driven portion 22' to drive the arc sliding part 122' move along the inner arc trajectory of the arc slot 121, thereby simultaneously driving the second screen 103 to rotate.

Figure 13:
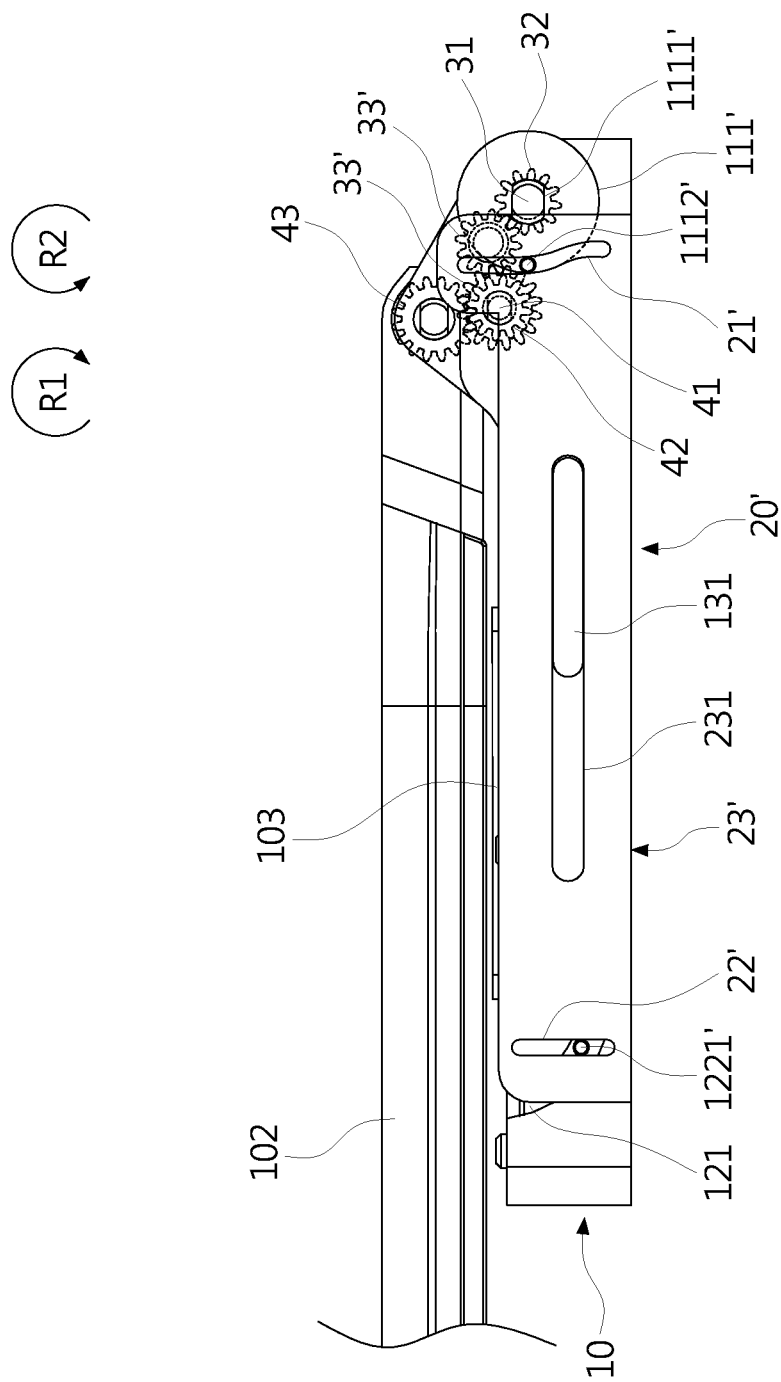
FIG. 13 to FIG. 16 are respectively side views of an electronic device using the hinge of FIG. 10 at 0, 30, 90, and 140 degrees.
Figure 14:
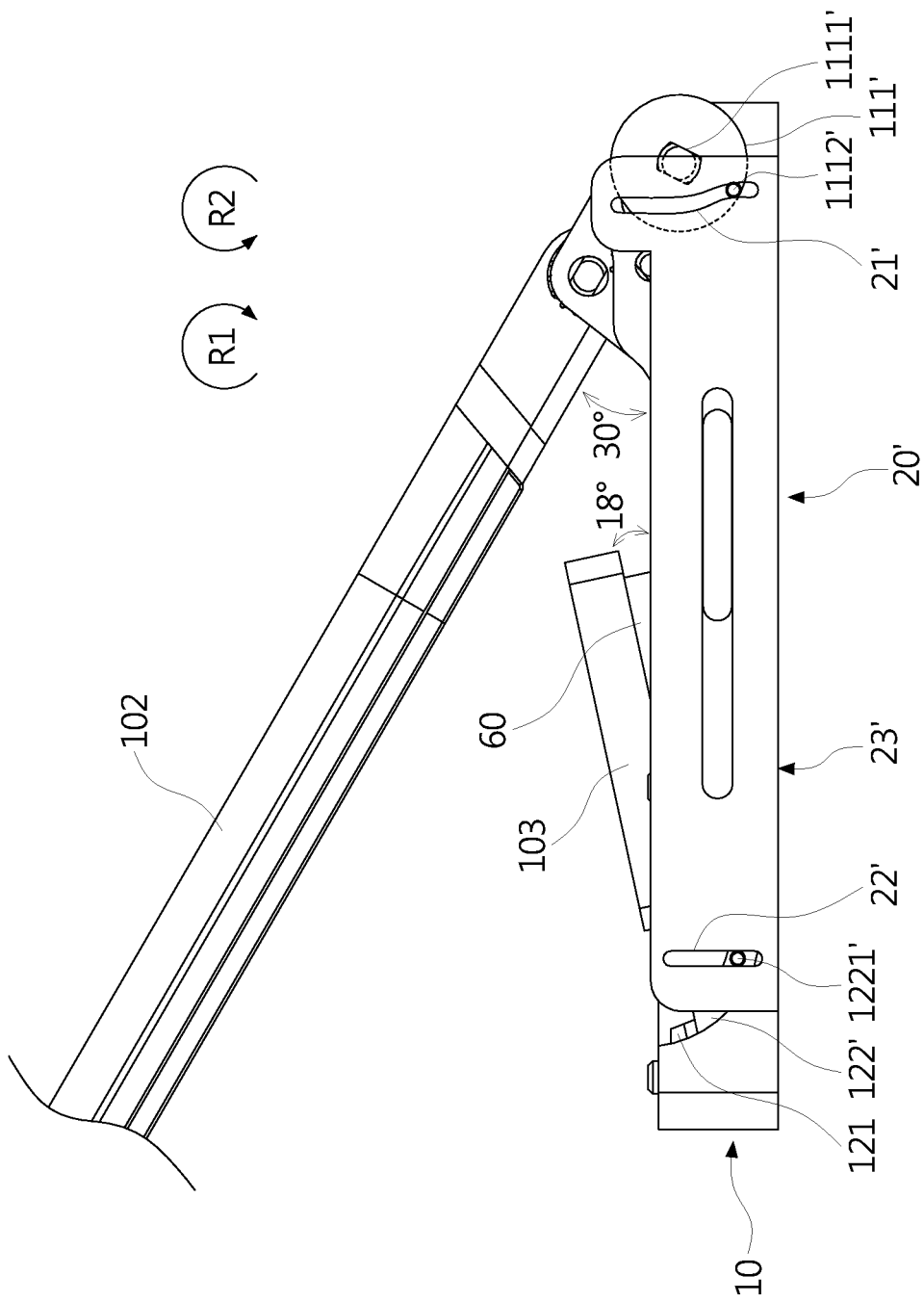
Figure 15:
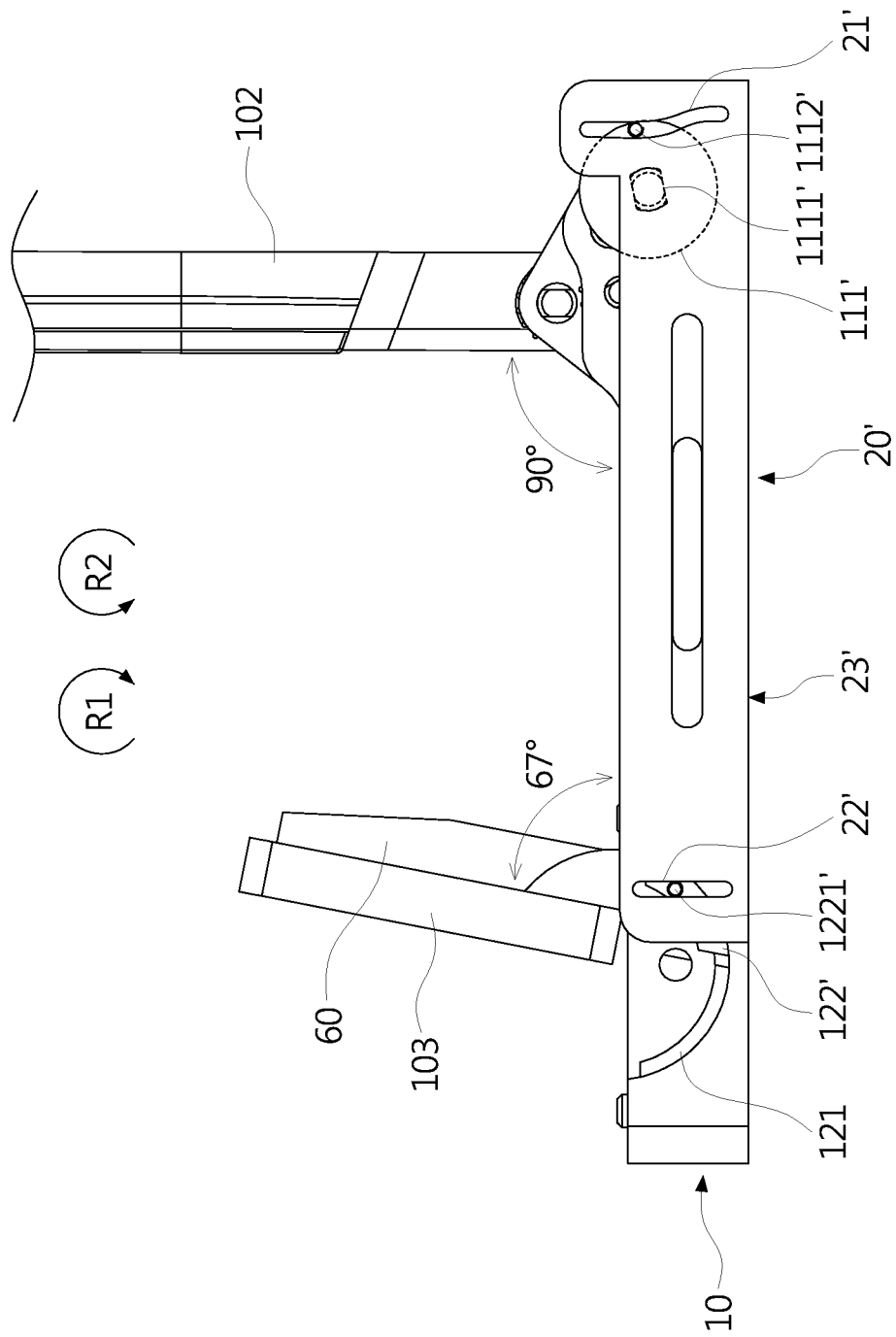
Figure 16:
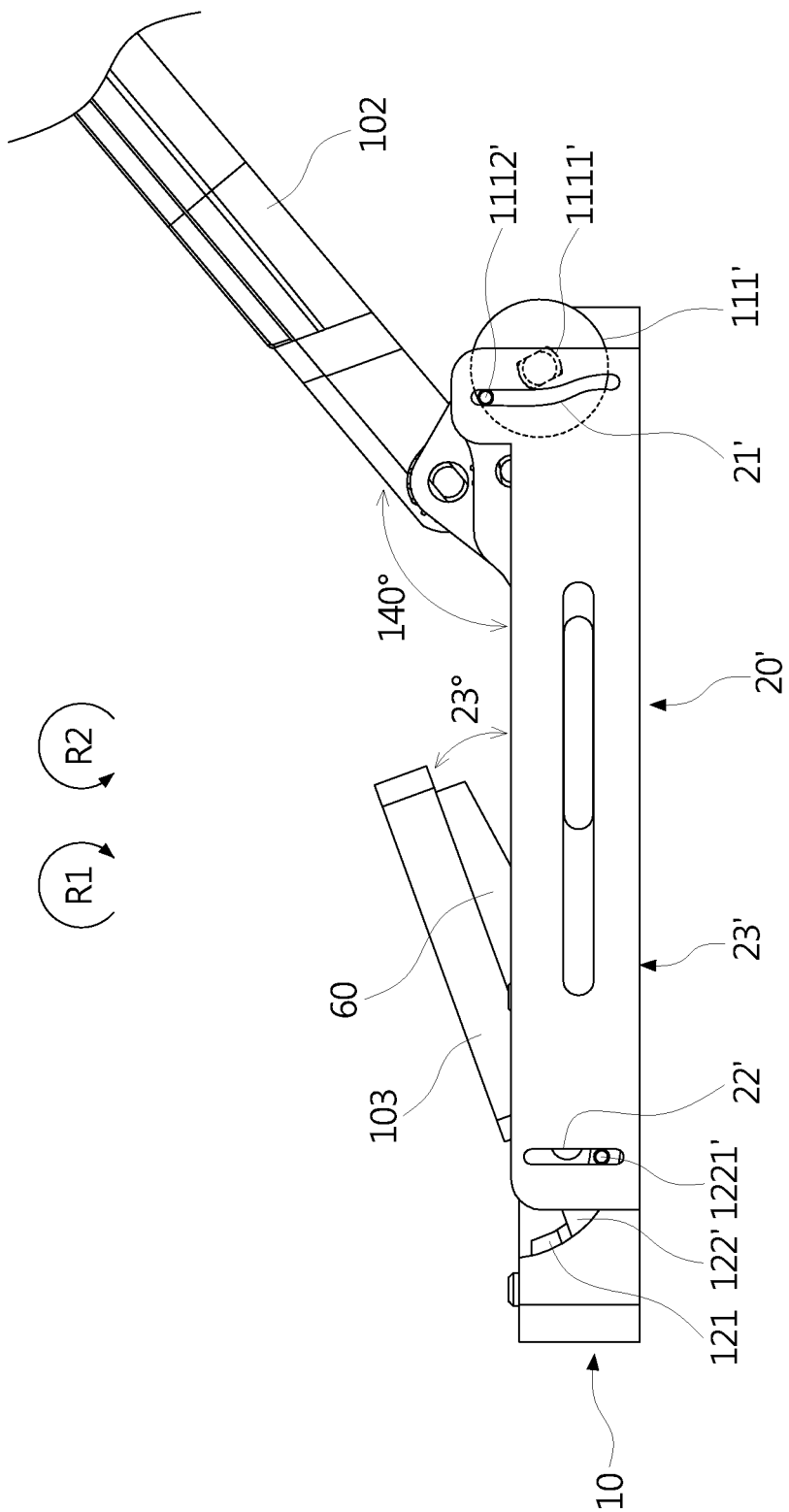

Referring to FIG. 13 to FIG. 16, FIG. 13 to FIG. 16 are respectively side views of an electronic device using the hinge of FIG. 10 at 0, 30, 90, and 140 degrees. In order to clearly view the operations of the operating part 111', the driver assembly 20' (consisting of the driving portion 21', the driven portion 22', and the linkage part 23' which are integrally formed), and the arc sliding part 122', the host base 101 of the electronic device is omitted in the figure. Because the base body 10 is mounted to the host base 101 and both of the base body 10 and the host base 101 are horizontally disposed, the angle between the first screen 102 and the base body 10 in the figure may be equivalent to the angle between the first screen 102 and the host base 101. As shown in FIG. 13, when the electronic device is at 0 degrees, the angle between the first screen 102 and the host base 101 is 0 degrees, and the angle between the second screen 103 and the host base 101 is 0 degrees. As shown in FIG. 14, when the electronic device is at 30 degrees, the angle between the first screen 102 and the host base 101 is 30 degrees, and the angle between the second screen 103 and the host base 101 is 18 degrees. As shown in FIG. 15, when the electronic device is at 90 degrees, the angle between the first screen 102 and the host base 101 is 90 degrees, and the angle between the second screen 103 and the host base 101 is 67 degrees. As shown in FIG. 16, when the electronic device is at 140 degrees, the angle between the first screen 102 and the host base 101 is 140 degrees, and the angle between the second screen 103 and the host base 101 is 23 degrees.

During the electronic device being open from 0 degrees (as shown in FIG. 13) to 30 degrees (as shown in FIG. 14), when the first screen 102 is lifted and the first screen 102 rotates in the clockwise direction R1 relative to the host base 101, the first screen 102 drives the first movable mounting part 50 and the second driven gear 43 to rotate in the clockwise direction R1, further drives the driven shaft part 41, the first driven gear 42, and the second driving gear 33' to rotate in the counterclockwise direction R2, further drives another second driving gear 33' to rotate in the clockwise direction R1, and further drives the driving shaft part 31 and the first driving gear 32 to rotate in the counterclockwise direction R2, so that the operating part 111' rotates in the counterclockwise direction R2 around the first axis connection hole 1111'. When the operating part 111' rotates in the counterclockwise direction R2 around the first axis connection hole 1111', the first axis connection part 1112' moves down in the longitudinal slot-shaped hole of the driving portion 21', drives the driver assembly 20' to move right, and further drives the arc sliding part 122' to move right along the inner arc trajectory of the arc slot 121, so that the arc sliding part 122' and the second screen 103 rotate in the counterclockwise direction R2 relative to the host base 101, and simultaneously drive the fourth axis connection part 1221' to move down in the longitudinal slot-shaped hole of the driven portion 22'.

During the electronic device being open from 30 degrees (as shown in FIG. 14) to 90 degrees (as shown in FIG. 15), when the first screen 102 rotates in the clockwise direction R1 relative to the host base 101, the first screen 102 continues to drive the first movable mounting part 50 and the second driven gear 43 to rotate in the clockwise direction R1, further drives the driven shaft part 41, the first driven gear 42, and the second driving gear 33' to rotate in the counterclockwise direction R2, further drives another second driving gear 33' to rotate in the clockwise direction R1, and further drives the driving shaft part 31 and the first driving gear 32 to rotate in the counterclockwise direction R2, so that the operating part 111' rotates in the counterclockwise direction R2 around the first axis connection hole 1111'. When the operating part 111' rotates in the counterclockwise direction R2 around the first axis connection hole 1111', the first axis connection part 1112' moves up in the longitudinal slot-shaped hole of the driving portion 21', drives the driver assembly 20' to move right, and further drives the arc sliding part 122' to move right along the inner arc trajectory of the arc slot 121, so that the arc sliding part 122' and the second screen 103 become to rotate in the clockwise direction R1 relative to the host base 101, and simultaneously drive the fourth axis connection part 1221' to move up in the longitudinal slot-shaped hole of the driven portion 22'.

During the electronic device being open from 90 degrees (as shown in FIG. 15) to 140 degrees (as shown in FIG. 16), when the first screen 102 and the second screen 103 are open, the hinge linkage structure performs a simple harmonic motion, so that the operating part 111' rotates to drive the driving portion 21', the linkage part 23', and the driven portion 22' to become to move from right to left. Specifically speaking, when the operating part 111' rotates in the counterclockwise direction R2 around the first axis connection hole 1111', the first axis connection part 1112' moves from the rightmost position to the upper position relative to the first axis connection hole 1111', and the first axis connection part 1112' moves up in the longitudinal slot-shaped hole of the driving portion 21' until it moves to the top edge of the longitudinal slot-shaped hole. At this time, the driver assembly 20' moves left to drive the arc sliding part 122' to move left along the inner arc trajectory of the arc slot 121, and the fourth axis connection part 1221' moves down in the longitudinal slot-shaped hole of the driven portion 22' until it moves to the bottom edge of the longitudinal slot-shaped hole. At this time, the first screen 102 and the second screen 103 rotate in the same direction to provide parallel slopes for viewing, and may provide the visual integrity and continuity when the two screens are at the working angle, thereby enhancing the convenience and smoothness of operation.

In summary, according to the embodiments of the present invention, the base body of the hinge is mounted to the host base of the electronic device having the two screens. The base body includes the operating portion and the linkage portion connected to each other. The first screen is connected to the operating portion by the first movable mounting part, and the second screen is connected to the linkage portion by the second movable mounting part. The first screen rotates according to the operating part of the operating portion, and the driver assembly of the hinge simultaneously drives the operating portion and the linkage portion to rotate, so that the first screen and the second screen rotate simultaneously. By the simple hinge linkage structure design, the two screens rotate in opposite directions when being open, and may provide parallel slopes for viewing when being open to a preset open angle, so that the two screens may provide the visual integrity and continuity when they are at the working angle, thereby enhancing the convenience and smoothness of operation.

While the present invention has been described by way of example and in terms of the preferred embodiments, it is to be understood that the present invention needs not be limited to the disclosed embodiments. For anyone skilled in the art, various modifications and improvements within the spirit of the present invention are covered under the scope of the present invention. The covered scope of the present invention is based on the appended claims.

What is claimed is:
1. An electronic device (100) comprising:
   a hinge including:
      a base body (10) comprising an operating portion (11), a linkage portion (12), and a base portion (13), the operating portion (11) and the linkage portion (12) being respectively connected to two ends of the base portion (13), the operating portion (11) having an operating part (111), the operating part (111) having a first axis connection hole (1111) and a first axis connection part (1112), the linkage portion (12) having a single arc slot (121), the single arc slot (121) being provided with an arc sliding part (122);
      a driver assembly (20) comprising a driving portion (21) and a driven portion (22) connected to each other, the driving portion (21) being pivotally connected to the first axis connection part (1112) of the operating part (111) of the operating portion (11), the driven portion (22) being pivotally connected to the arc sliding part (122) of the linkage portion (12);
      a driving gear assembly (30) being connected to the first axis connection hole (1111) of the operating part (111) of the operating portion (11), the driving gear assembly (30) being located on an opposite side of the driver assembly (20);
      a driven gear assembly (40) being pivotally connected to the driving gear assembly (30), the driven gear assembly (40) cooperating with the driving gear assembly (30) to rotate accordingly;
      a first movable mounting part (50); and
      a second movable mounting part (60) being axially connected to the arc sliding part (122);
      wherein, when the operating part (111) rotates more than half a turn, the driving portion (21) of the driver assembly (20) drives the driven portion (22) to drive the arc sliding part (122) to move back and forth along an inner arc trajectory of the single arc slot (121);
   a host base (101), the base body (10) of the hinge being mounted to the host base (101);
   a first screen (102) being electrically connected to the host base (101), the first screen (102) being connected to the operating portion (11) by the first movable mounting part (50); and
   a second screen (103) being electrically connected to the host base (101), the second screen (103) being connected to the linkage portion (12) by the second movable mounting part (60);

wherein, the first screen (102) rotates according to the operating part (111), the driving portion (21) of the driver assembly (20) drives the driven portion (22) to drive the arc sliding part (122) to move along the inner arc trajectory of the single arc slot (121), thereby simultaneously driving the second screen (103) to rotate, wherein when an angle between the first screen (102) and the host base (101) of the electronic device (100) is from 0 degrees to a first angle, the operating part (111) rotates in a clockwise direction (R1) around the first axis connection hole (1111) to drive the arc sliding part (122) to move right along the inner arc trajectory of the single arc slot (121), so that the first screen (102) rotates in the clockwise direction (R1) and the second screen (103) rotates in a counterclockwise direction (R2);

wherein when the angle between the first screen (102) and the host base (101) of the electronic device (100) is from the first angle to a second angle which is larger than the first angle, the operating part (111) continues to rotate in the clockwise direction (R1) around the first axis connection hole (1111) to drive the arc sliding part (122) to move left along the inner arc trajectory of the single arc slot (121), so that the first screen (102) and the second screen (103) rotate in the clockwise direction (R1).

2. The electronic device of claim 1, wherein the driving gear assembly (30) comprises at least one driving shaft part (31), a first driving gear (32), and a second driving gear (33) engaging with each other, two ends of the driving shaft part (31) being respectively axially connected to the operating part (111) and the first driving gear (32), the driven gear assembly (40) comprising at least one driven shaft part (41), a first driven gear (42), and a second driven gear (43) engaging with each other, the driven shaft part (41) being axially connected to the first driven gear (42) and the second driving gear (33).

3. The electronic device of claim 2, wherein the first movable mounting part (50) being axially connected to the second driven gear (43).

4. The electronic device of claim 2, wherein the hinge further comprises a torque assembly (70), the driven gear assembly (40) further comprising a third driven gear (44), the torque assembly (70) being connected to one side of the third driven gear (44), the third driven gear (44) and the second driven gear (43) engaging with each other.

5. The electronic device of claim 4, wherein the hinge further comprises a fixing part (80) located on one side of the second driven gear (43) and the third driven gear (44).

6. The electronic device of claim 2, wherein the hinge further comprises a torque assembly (70') and a first movable mounting part (50), the torque assembly (70') being connected between the first movable mounting part (50) and the second driven gear (43).

7. The electronic device of claim 1, wherein the driver assembly (20) further comprises a linkage part (23), two ends of the linkage part (23) being respectively pivotally connected to the driving portion (21) and the driven portion (22), the linkage part (23) having a limit position opening (231), the base portion (13) being provided with a stop part (131), the stop part (131) being located in the limit position opening (231).

8. The electronic device of claim 7, wherein a movement margin of the stop part (131) in the limit position opening (231) is equal to a moving range of the arc sliding part (122) in the single arc slot (121) and a moving range of the driving portion (21) driving the operating part (111).

9. The electronic device of claim 1, wherein the operating portion (11) further comprises two spacers (112) arranged at intervals to define a first accommodating space (113) and a second accommodating space (114), the driving gear assembly (30) being disposed in the first accommodating space (113), the driven gear assembly (40) being disposed in the second accommodating space (114).

\* \* \* \* \*